United States Patent [19]

Lymburner

[11] Patent Number: 4,899,625
[45] Date of Patent: Feb. 13, 1990

[54] WRENCH FOR WHEEL LUG NUT

[76] Inventor: Kenneth Lymburner, R.R. 1, Box 106, Osage, Minn. 56570

[21] Appl. No.: 392,715

[22] Filed: Aug. 11, 1989

[51] Int. Cl.$^4$ ................................................ B25B 9/00
[52] U.S. Cl. ................................................................ 81/13
[58] Field of Search ..................................... 81/13, 55

[56] References Cited

U.S. PATENT DOCUMENTS 2,305,274 12/1942 Power ...................................... 81/13
4,191,235 3/1980 Davis ....................................... 81/13

*Primary Examiner*—Roscoe V. Parker
*Attorney, Agent, or Firm*—James V. Harmon

[57] ABSTRACT

A wrench suited for retaining a wheel lug nut in place during removal of a broken wheel stud or lug bolt of a vehicle. The tool comprises an elongated wrench body with upper and lower opposing faces. A polygonal opening is provided at one end to receive the nut and extends all the way from the lower to the upper face of the tool. The tool includes a retaining head located at the opposite end of the tool from the opening. The retaining head is secured to the lower face of the tool and has at least one upwardly facing laterally extending shoulder. Each such shoulder has an upwardly directed face adapted to underlie the inner edge of the wheel rim when the tool is in use with the opening mounted upon the wheel lug nut to help hold retain the tool in place during use.

5 Claims, 1 Drawing Sheet

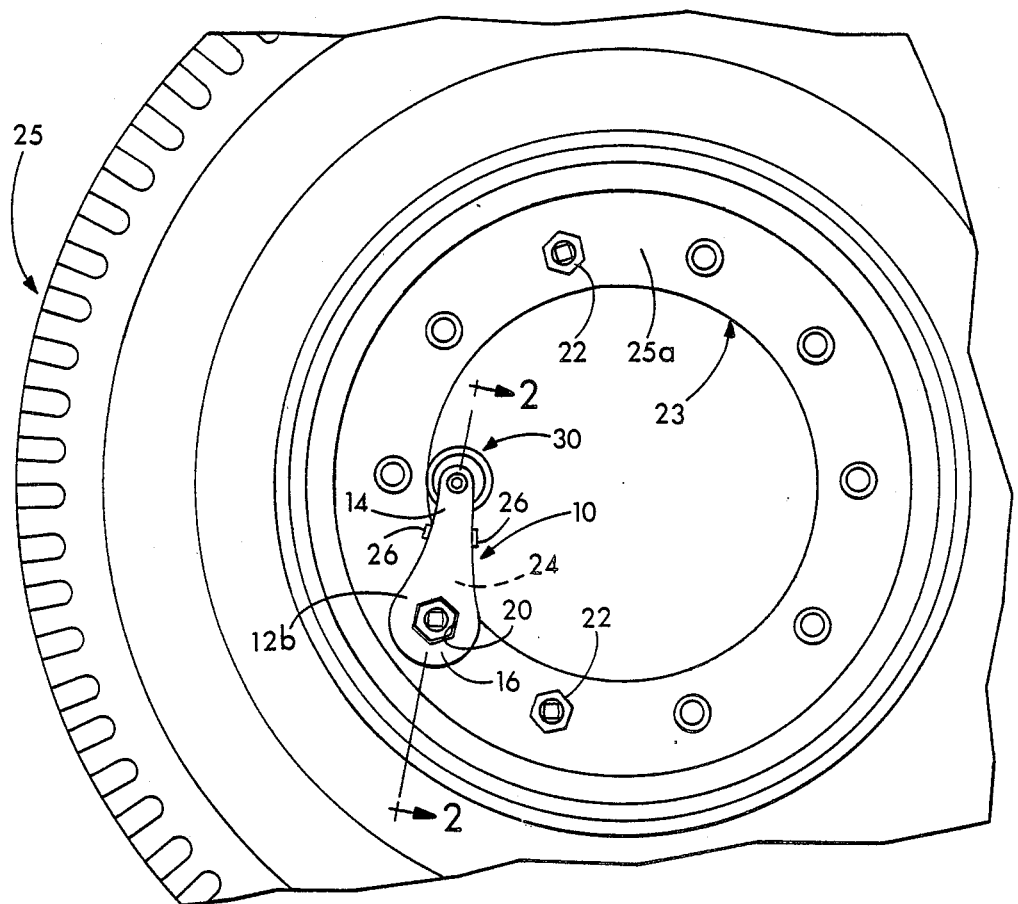
FIG. 1
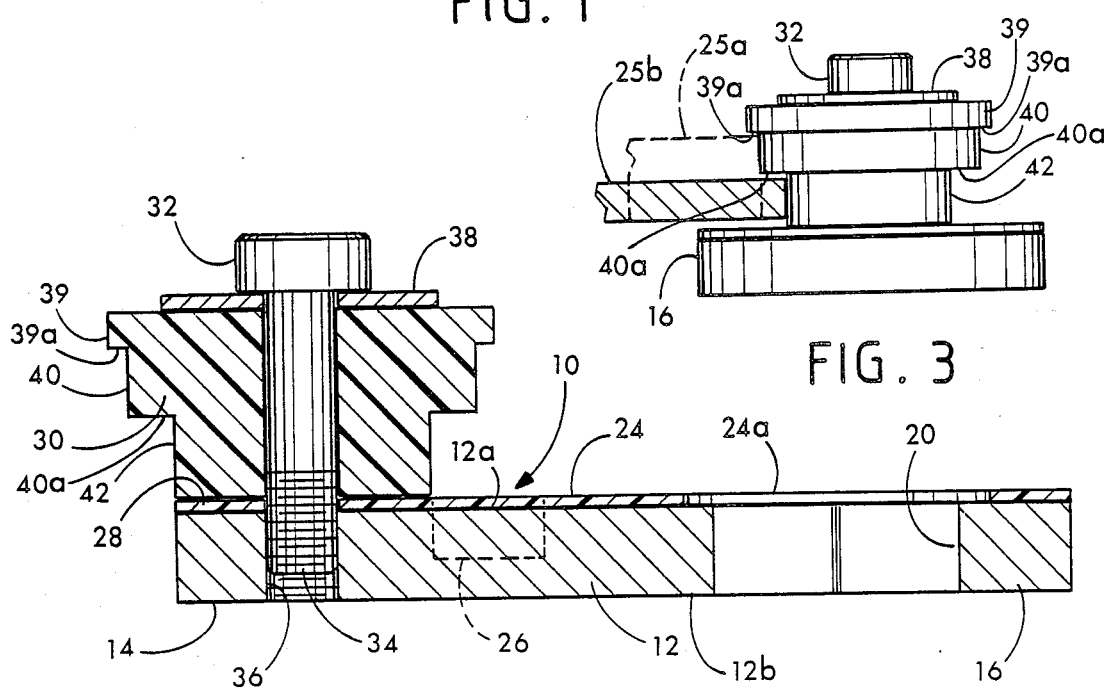
FIG. 3
FIG. 2

WRENCH FOR WHEEL LUG NUT

FIELD OF THE INVENTION

The present invention relates to tools and more particularly a special purpose wrench particularly suited for holding a wheel lug nut when removing or installing a jammed or broken lug bolt or stud.

BACKGROUND OF THE INVENTION

When the wheel lug bolt or stud of a heavy vehicle becomes broken or needs to be extracted, the lug nut must be held securely in place. Various wrenches have been used in the past but they have not been entirely satisfactory. One important deficiency is that the tools heretofore available were likely to wobble or fall off the nut. It is therefore an objective to provide a feature for retaining or locking the tool in a fixed position during use to keep it from wobbling or falling off. Another problem is that prior tools could mar the tire rim or produce an irritating metallic clanking sound during use particularly when an impact wrench is used. It is therefore another object to provide a means for protecting surfaces such as highly polished aluminum wheel rims and to muffle the noise produced when the tool is used.

These and other more detailed and specific objects of the present invention will be apparent in view of the following description setting forth by way of example but one of the various forms of the invention that will be apparent to those skilled in the art once the principles described herein are understood.

THE FIGURES

FIG. 1 is a partial side elevational view of a tire and wheel with the tool positioned in place for use;

FIG. 2 is an enlarged cross-sectional view taken on line 2—2 of FIG. 1; and

FIG. 3 is an end view of the tool as seen from its upper end in FIG. 1.

SUMMARY OF THE INVENTION

The invention provides a wrench particularly well adapted for retaining a wheel lug nut in place during removal of a broken wheel stud or lug bolt. The tool comprises an elongated wrench body with upper and lower opposing faces. A polygonal opening extends from the lower face to the upper face. The tool includes a retaining head located at the opposite end of the tool from the opening. The retaining head is secured to the lower face of the tool and has at least one laterally extending shoulder. Each such shoulder has an upwardly directed face adapted to underlie the inner edge of the wheel rim when the tool is in use with the opening mounted upon the wheel lug nut. The engagement between the upper face of the shoulder and the inner edge of the wheel helps to retain the tool in place during use.

DETAILED DESCRIPTION

Shown in the figures is a wrench 10 having an elongated body 12 with ends 14 and 16. The body 12 also includes a lower face 12a which during use is placed adjacent to a rim 25a of a wheel 25 and an opposing upper face 12b. At the right end is an opening 20 which extends all the way from the lower face 12a to the upper face 12b and is of the proper size to fit over a wheel lug nut 22. Covering the lower face 12a is a shield 24 formed from a sheet of a strong flexible material such as a tough plastic resin sheet such as polyethylene tetrathalate or polymethylamethacrylate having tabs 26 that extend along each side of the center portion of the tool body 12. The shield 24 is provided with an opening 24a aligned with the opening 20 and includes a portion 28 interposed between the end 14 of the tool and a retaining head 30 which is secured to the lower face 12a of the tool by means of a fastener such as a shoulder bolt 32. A washer 38 can be used under the head of the bolt 32.

The retaining head 30 is preferably formed from a suitable plastic resin such as polyethylene, polypropylene, nylon or the like and includes a first shoulder 39 having an upper face 39a, a second shoulder 40 having an upper face 40a, and a boss 42 for spacing the shoulder 40a away from the tool body 12. It will be seen that each successive shoulder 39, 40 proceeding in the direction of the lower face 12a of the tool is centrally offset with respect to the adjacent shoulder.

During use as shown in FIGS. 1 and 3, the shoulder 39 underlies wheel rim 25a with the edge of the wheel rim abutting the circular surface of the shoulder 40. If the rim is aligned closer to the elevation of the nut, say for example as in the case of a steel wheel rim for a large semi-trailer, the wheel rim will be located as shown at 25b in FIG. 3 and will be engaged by the upper face 40a of the shoulder 40. The right edge of the rim 25b will abut against the cylindrical surface of the boss 42. The rim shown at 25a in FIG. 3 represents the typical location of the wheel rim in the case of a one inch thick aluminum wheel, while the rim at 25b typifies the location of the wheel rim in the case of a one-half inch thick steel wheel. In this way, the provision of two shoulders 39 or 40 allows engagement with two different wheel rim configurations to reliably hold or lock the tool in place during use in either case.

It is preferred that the retaining head 30 comprise a block of plastic including three portions: a first cylindrical shoulder 39, a second cylindrical shoulder 40 of a reduced diameter, and adjacent to shoulder 40 a boss 42 of cylindrical shape. It can therefore be seen that the retaining head 30 is composed of a body formed from plastic resin which includes three cylindrical portions of declining cross-section proceeding toward the lower face 12a of the tool 10. Each of the cylindrical portions 39 and 40 has a flat surface between itself and the next cylindrical portion which defines the upwardly directed faces 39a and 40a, respectively, which engage the inner edge of the wheel rim 25a to hold the tool in place during use.

From this description it can be seen that engagement of the shoulder 39 or 40 as the case may be with the rim 25a or rim 25b, whichever is in use, will reliably hold the tool in place to prevent it from wobbling or falling off. The plastic surface of the head 30 and the shield 24 will muffle the rattle produced when the tool is used and will protect the surface of the wheel from becoming marred.

Many variations of the present invention within the scope of the appended claims will be apparent to those skilled in the art once the principles described herein are understood.

What is claimed is:

1. A wrench comprising, an elongated wrench body having an upper and a lower face, a polygonal opening at one end thereof to receive a nut and extending from the lower face to the upper face, a retaining head located at the other end of the tool from the opening, the retaining head being secured to the lower face thereof, said retaining head having at least one upwardly facing laterally extending shoulder, each such shoulder having a face upwardly directed toward the lower face of the wrench body and adapted to underlie an inner edge of a wheel rim when the tool is in use with the opening mounted upon a wheel lug nut.

2. The wrench of claim 1 wherein said tool includes a plurality of said shoulders and each adjacent successive shoulder proceeding in the direction of the lower face of the tool is centrally offset with respect to an adjacent shoulder.

3. The wrench of claim 1 wherein the retaining head comprises a body formed from plastic resin and including at least three cylindrical portions of declining cross-section proceeding towards the lower face of the tool whereby each cylindrical portion has a flat surface defining said upwardly directed face adapted to engage the inner edge of the wheel rim to help retain the tool in place during use.

4. The wrench of claim 1 wherein a shield composed of a tough plastic resinous sheet is provided on the lower face of said tool.

5. The wrench of claim 4 wherein the shield is interposed between the retaining head and the lower face of the tool and is held in place by the retaining head.

* * * * *